(12) United States Patent
Breedvelt-Schouten et al.

(10) Patent No.: US 10,237,213 B2
(45) Date of Patent: Mar. 19, 2019

(54) ONLINE CHAT QUESTIONS SEGMENTATION AND VISUALIZATION

(71) Applicant: INTERNATIONAL BUSINESS MACHINES CORPORATION, Armonk, NY (US)

(72) Inventors: Ilse M. Breedvelt-Schouten, Manotick (CA); Jana H. Jenkins, Raleigh, NC (US); Jeffrey A. Kusnitz, Campbell, CA (US); John A. Lyons, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 15/278,053

(22) Filed: Sep. 28, 2016

(65) Prior Publication Data
US 2018/0091448 A1 Mar. 29, 2018

(51) Int. Cl.
G06F 17/27 (2006.01)
H04L 12/58 (2006.01)
H04L 29/08 (2006.01)
G06F 17/30 (2006.01)

(52) U.S. Cl.
CPC ............ *H04L 51/04* (2013.01); *G06F 17/279* (2013.01); *G06F 17/30705* (2013.01); *H04L 51/16* (2013.01); *H04L 67/22* (2013.01)

(58) Field of Classification Search
CPC ......... H04L 51/04; H04L 51/16; H04L 67/22; G06F 17/279
See application file for complete search history.

(56) References Cited

U.S. PATENT DOCUMENTS

| | | |
|---|---|---|
| 8,190,999 B2 | 5/2012 | Chen et al. |
| 9,300,790 B2 | 3/2016 | Gainsboro et al. |
| 9,381,813 B2 | 7/2016 | Hampiholi et al. |
| 9,596,200 B1 | 3/2017 | Chen et al. |
| 9,679,292 B2 | 6/2017 | Bauchot et al. |
| 9,853,824 B2 | 12/2017 | Zimmet et al. |
| 2007/0100986 A1 | 5/2007 | Bagley et al. |

(Continued)

FOREIGN PATENT DOCUMENTS

| | | |
|---|---|---|
| WO | 02093414 A1 | 11/2002 |
| WO | 2009012117 A1 | 1/2009 |

OTHER PUBLICATIONS

Wong, "The 6 Best Free Online Meeting Tools to Collaborate With Your Team," Workspace Collaboration, Jan. 3, 2011, http://www.makeuseof.com/tag/6-free-online-meeting-tools-collaborate-team/, pp. 1-11.

(Continued)

*Primary Examiner* — Viet D Vu
(74) *Attorney, Agent, or Firm* — Dmitry Paskalov (57) ABSTRACT

A computer monitors communications between at least two users on the electronic communication platform. The computer associates the monitored communications with one or more communication segments, while each communication segment being associated with a corresponding graphical user interface (GUI) component of a communication program. The computer identifies a question within the monitored communications and associates the identified question with at least one question component of the GUI of at least one of the one or more communication segments.

18 Claims, 7 Drawing Sheets

(56) References Cited

U.S. PATENT DOCUMENTS

| | | | |
|---|---|---|---|
| 2014/0324982 A1 | 10/2014 | Agrawal et al. | |
| 2015/0120680 A1 | 4/2015 | Alonso et al. | |
| 2015/0142888 A1 | 5/2015 | Browning et al. | |
| 2015/0200879 A1* | 7/2015 | Wu | H04L 51/046 715/758 |
| 2016/0021039 A1* | 1/2016 | Woo | H04L 51/046 715/752 |
| 2016/0065519 A1 | 3/2016 | Waltermann et al. | |
| 2016/0241494 A1 | 8/2016 | Badge et al. | |
| 2017/0154495 A1* | 6/2017 | Sri | G07F 17/3244 |
| 2017/0161389 A1 | 6/2017 | Chu et al. | |
| 2017/0214650 A1 | 7/2017 | Balasaygun et al. | |
| 2017/0324868 A1* | 11/2017 | Tamblyn | H04M 3/5191 |
| 2018/0012231 A1* | 1/2018 | Sapoznik | G06Q 30/016 |

OTHER PUBLICATIONS

Meetingbooster, "Professional Meeting Management Software," http://www.meetingbooster.com/, Copyright 2016 MeetingBooster, Printed on Mar. 3, 2016, pp. 1-4.

Trausan-Matu et al., "Visualisation of Learners' Contributions in Chat Conversations," Blended Learning, Pearson, 2007 (Best date available), Workshop on Blended Learning 2007, Edinburgh, United Kingdom, pp. 217-226.

Neira et al., "An Access Monitoring Tool Based on Cookies for Course Blended Management Systems," Workshop on Blended Learning 2007, Edinburgh, United Kingdom, Aug. 15-17, 2007, http://www.researchgate.net/profile/J_Angel_Velazquez-Iturbide publication/ 242468726_An_Access_ Monitoring_Tool_Based_on_ Cookies_for_Course_Management_Systems/links/ 0f31753c62d0de657e000000.pdf, Article: Jan. 2007, pp. 1-349.

Nguyen et al., "SITS: A Hierarchical Nonparametric Model using Speaker Identity for Topic Segmentation in Multiparty Conversations," Proceedings of the 50th Annual Meeting of the Association for Computational Linguistics, Jeju, republic of Korea, Jul. 2012, Copyright 2012 Association for Computational Linguistics, pp. 78-87.

Trampuš et al., "Visualisation of Online Discussion Forums," Empowering Open and Collaborative Governance, Chapter 9, Jan. 31, 2012, pp. 157-179.

Weisz, "Segmentation and Classification of Online Chats," Computer Science Department, Carnegie Mellon University, Pittsburgh, PA, 15213, Published: 2008 (Best date available), pp. 1-8.

You et al, "A Unified Fusion Framework for Time-Related Rank in Threaded Discussion Communities," Trends and Applications in Knowledge Discovery and Data Mining, vol. 8643 of the series Lecture Notes in Computer Science, Nov. 26, 2014, pp. 513-524.

Wang et al, "Thread Segmentation Based Answer Detection in Chinese Online Forums," Acta Automatica Sinica, vol. 39, No. 1, Jan. 2013, Science Direct, pp. 11-20.

Mell et al., "The NIST Definition of Cloud Computing," National Institute of Standards and Technology, U.S. Department of Commerce, Special Publication 800-145, Sep. 2011, pp. 1-7.

IBM: List of IBM Patents or Patent Applications Treated as Related (Appendix P), Aug. 18, 2017, pp. 1-2.

Breedvelt-Schouten et al., Pending U.S. Appl. No. 15/661,637, filed Jul. 27, 2017, titled: Online Chat Questions Segmentation and Visualization, pp. 1-34.

\* cited by examiner

ONLINE CHAT QUESTIONS SEGMENTATION AND VISUALIZATION

BACKGROUND

Embodiments of the invention generally relate to an electronic natural language processing of an online chat, and more particularly, to segmenting a conversation by topics and identifying, arranging and visualizing questions asked during the conversation.

Online chat is a communication over a network that offers real-time transmission of text messages from sender to receiver. Online chat may address point-to-point communications as well as multicast communications from one sender to many receivers and may incorporate voice and video chat, or may be a feature of a web conferencing service.

SUMMARY

Embodiments of the invention include a method, computer program product, and system, for an online chat, and more particularly, to segmenting a conversation by topics and identifying, arranging and visualizing questions asked during the conversation. A computer monitors communications between at least two users on the electronic communication platform. The computer associates the monitored communications with one or more communication segments, while each communication segment being associated with a corresponding graphical user interface (GUI) component of a communication program. The computer identifies a question within the monitored communications and associates the identified question with at least one question component of the GUI of at least one of the one or more communication segments.

DETAILED DESCRIPTION

As previously described, an online chat may be a multicast communication connecting many participants worldwide. The online chat is used by organizations as an integrated part to a video or sound broadcast of a presentation, where there are different speakers and all the participants may ask the participants or the moderator (manager) of the presentation different questions related to the subject.

When the online chat involves multiple participants and different presenters, answering the questions and tracking the answers is a tedious task that typically is impossible when there are different questions that are addressed to various moderators (presenters or managers of the online chat). Present embodiment provides a solution to an online problem of following up, segmenting, and addressing all of the questions that are transmitted by participant.

Figure 1:
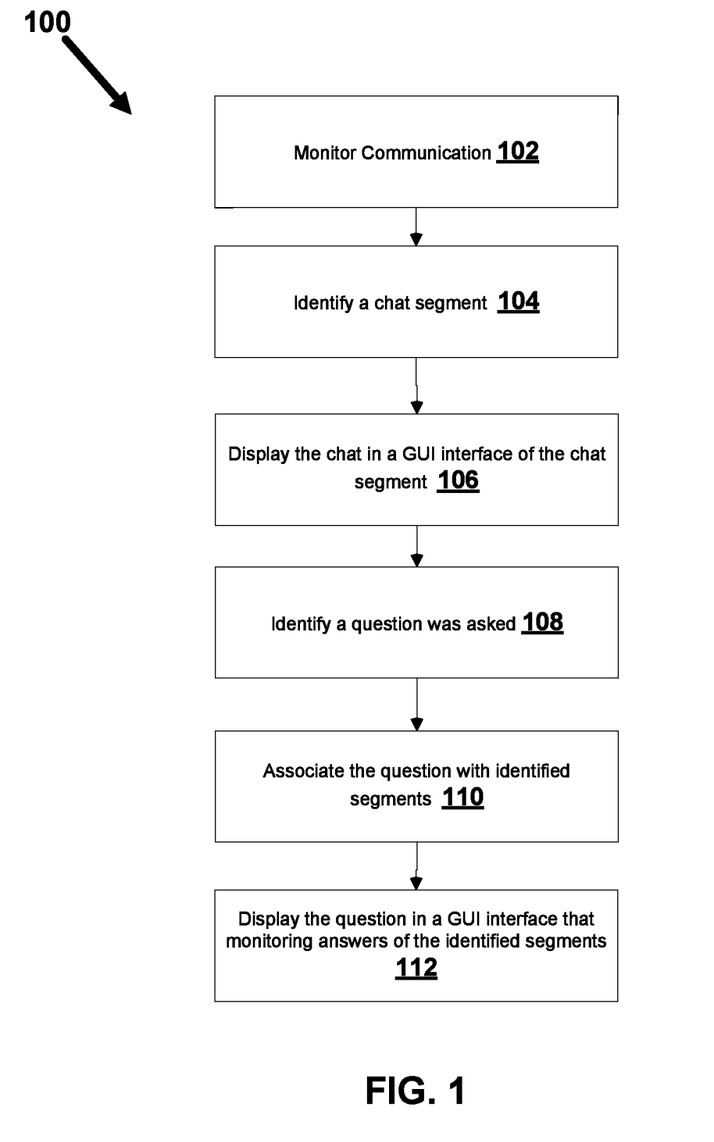
FIG. 1 is a diagram depicting a high-level overview of a method 100 for online chat questions identification, topic segmentation, and visualization.

FIG. 1 is a diagram depicting a high-level overview of a method 100 for online chat questions identification and topic segmentation by applying natural language processing (NLP) techniques, and subsequent visualization of different conversations divided by topic. Method 100 represents one embodiment of the invention, and therefore should not be viewed as limiting the invention; the invention is defined in the claims.

Generally, method 100 monitors some or all the incoming communication 102 that includes messages from different users and associates them to different segments 104 of the conversation. Segments are different parts of the conversation that are related to a specific subject such as, specific topic, specific moderator (presenter), specific subject, or specific time. Each segment is displayed in a different Graphic User Interface (GUI) 106. By using NLP, method 100 identifies when a question 108 is asked by the user, associates the question with a segment 110 and displays the identified questions in associated GUI that relates to the question asked.

Figure 2:
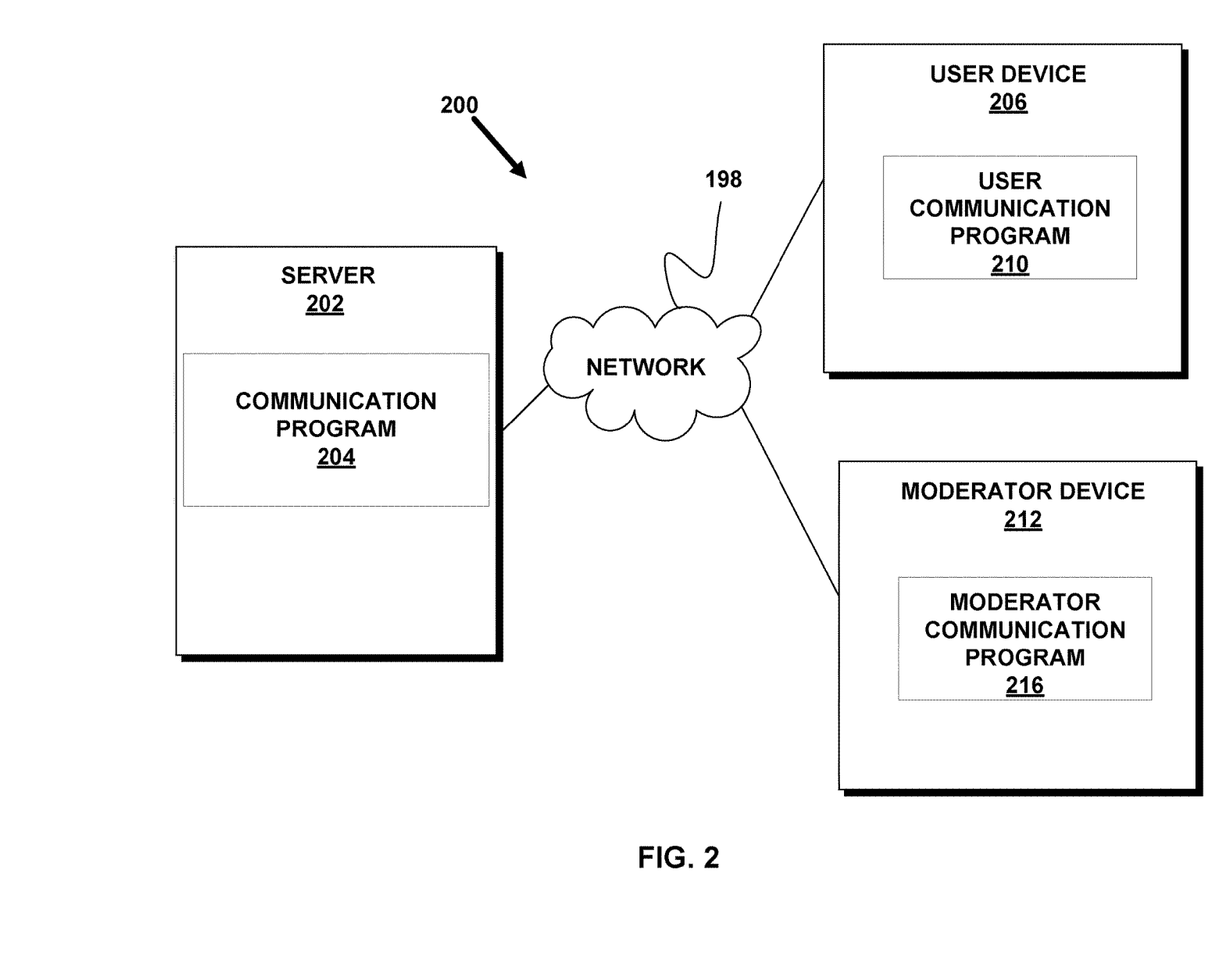
FIG. 2 is a functional block diagram of an electronic communication platform 200, according to an embodiment of the invention.

FIG. 2 is a functional block diagram of an electronic communication platform 200, according to an embodiment of the invention. Referring to FIG. 2, electronic communication platform 200 may be embodied as a computing device, a component of a computing device, or a program having a set of modules or programming instructions embodied on a computing device. Additional details of the structure and implementation of electronic communication platform 200 are discussed in connection with FIG. 4.

Electronic communication platform 200 may include computing devices such as server 202, user device 206, and moderator device 212 all interconnected via network 198. According to an example embodiment, a computing device is a system configured to receive and send communications that are required to connect to an online chat. For example, computing device may be a server, a mobile computer, a notebook, a laptop computer, a tablet computer, a handheld device, a smart-phone, a thin client, or any other electronic device or computing system capable of receiving and sending online chat messages via network 198.

In accordance with an embodiment of the invention, network 198 is the Internet, representing a worldwide collection of networks and gateways to support communications between devices connected to the Internet. Accordingly, network 198 may include, for example, wired, wireless or fiber optic connections. In other embodiments, network 198 may be implemented as an intranet, a local area network (LAN), or a wide area network (WAN). In general, network 198 may be any combination of connections and protocols that will support communications between server 202, user device 206, and moderator device 212.

User communication program 210 is a software program configured to connect user device 206 to an online chat monitored by communication program 204 via network 198. According to an example embodiment, user communication program 210 is stored and executed on user device 206 and configured to send and receive messages to the online chat administered and monitored by communication program 204. In another embodiment, user communication program 210 may be integrated into communication program 204 or stored on server 202, and accessed by a web browser of user device 206.

Moderator communication program 212 is a software program configured to connect moderator device 212 to an online chat monitored by communication program 204 via network 198. According to an example embodiment, moderator communication program 216 is stored and executed on moderator device 212 and configured to send and receive messages to the online chat administered and monitored by communication program 204. In addition, moderator communication program 216 is configured to display the GUI of a communication program 204 representing communication segmentation, as described in greater details with regard to FIG. 3. In an embodiment, moderator communication program 216 may be integrated into communication program 204 or stored on server 202, and accessed by a web browser of user device 206. In a further embodiment, functions of moderation communication program 216 may be available for execution on multiple user devices, such that more than one user may act as moderators, or that the role of moderator may change from user to user.

Communication program 204 is a software program configured to monitor communications transmitted by users of an online chat, divide the communication into a segment and identify if one of the user asked a question utilizing NLP and associate the question with the corresponding segment.

Communication program 204 monitors online chat communications transmitted via network 198 by receiving some or all the communications as a part of an online chat managing software. Communication program 204 may be a standalone program or integrated into a chat service software executed on server 202.

Segments of communications may be generated and organized according to topics of the communications that the segments contain. For example, these topics may be predetermined by a moderator, or determined by communication program 204 during runtime while monitoring online chat communications. Monitoring is performed utilizing NLP to find associations and connections between communications and may be performed utilizing cognitive computing such as software capable of discovering relations between the communications and subsequent segmentation according to discovered relations. According to an embodiment of the invention, moderator may predetermine the topics of the segments that communication program 204 implements while monitoring the communications. For example, in an embodiment, if one of the moderators predetermined that the topics are names of the other moderators in an online chat, communication program 204 will segment the communications according to the corresponding moderators associated with each communication. In another embodiment, communication program 204 may divide the communications by applying cognitive computing analysis and segmenting the communications according to relations between the communications. For example, if there are several communications that include a timeframe, a specific time, a specific date and a question asks time or date related question, communication program 204 will segment the related communications including time, date, or timeframe under one topic.

Communication program 204 utilizes NLP to identify if a question is asked. For example, communication program 204 may analyze if the communication is structured as a question or has a question mark in the communication. If the question is detected in the monitored communications, communication program 204 associates the question to a segment that the question is related to. For example, if the moderator is John Doe and a user asks a question who is the moderator, communication program 204 associates the question with the communication segment "John Doe."

According to an embodiment of the invention, each time after identifying a communication with a question, communication program 204 associates the segment with a GUI of communication program 204 representing the topic and displays the question to the moderator in a segment related GUI where the corresponding communications are displayed. In another embodiment, communication program 204 analyzes communications related to the same segment and suggests an answer to the moderator after the question and lets the moderator either accept or reject the suggested answer. In further embodiments, communication program 204 GUI displays to the moderator if the question was answered or not using different colors. For example, if the moderator answered the question, the text or a special icon such as a color bar, or tab, above or beyond the segment name will change its color to green if all or some of the questions in the segment were answered. If there are unanswered questions in a segment, the color bar above or beyond the segment name will be colored in red. In another embodiment, as many bars as there are questions may be displayed (this may be limited to a maximum number), with each bar representing a question, and the corresponding color indicating whether the question is answered or still open.

Figure 3:
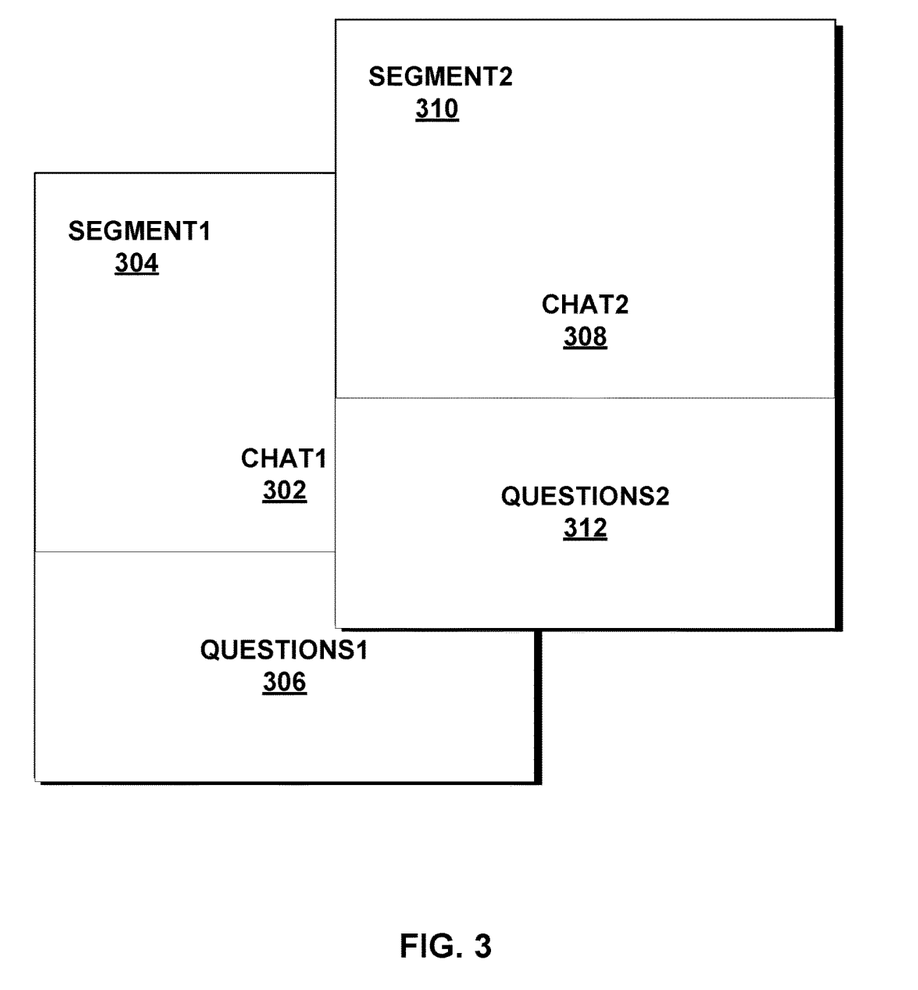
FIG. 3 is an example embodiment of a GUI of a communication program representing segmentation, according to an embodiment of the invention.

FIG. 3 represents an example of GUI segmentation of communications, according to an embodiment of the invention. For example, if segment1 304 represents a general segment of an online chat communications, the messages would be displayed in chat1 302 field, while the questions would be displayed in questions1 306 field. If there is a specific segment, in addition to the general segment, additional GUI segment2 310 is displayed, and associated communications (messages) would be displayed in chat2 308 and the questions associated with segment2 310, are displayed in questions2 312 field.

Figure 4:
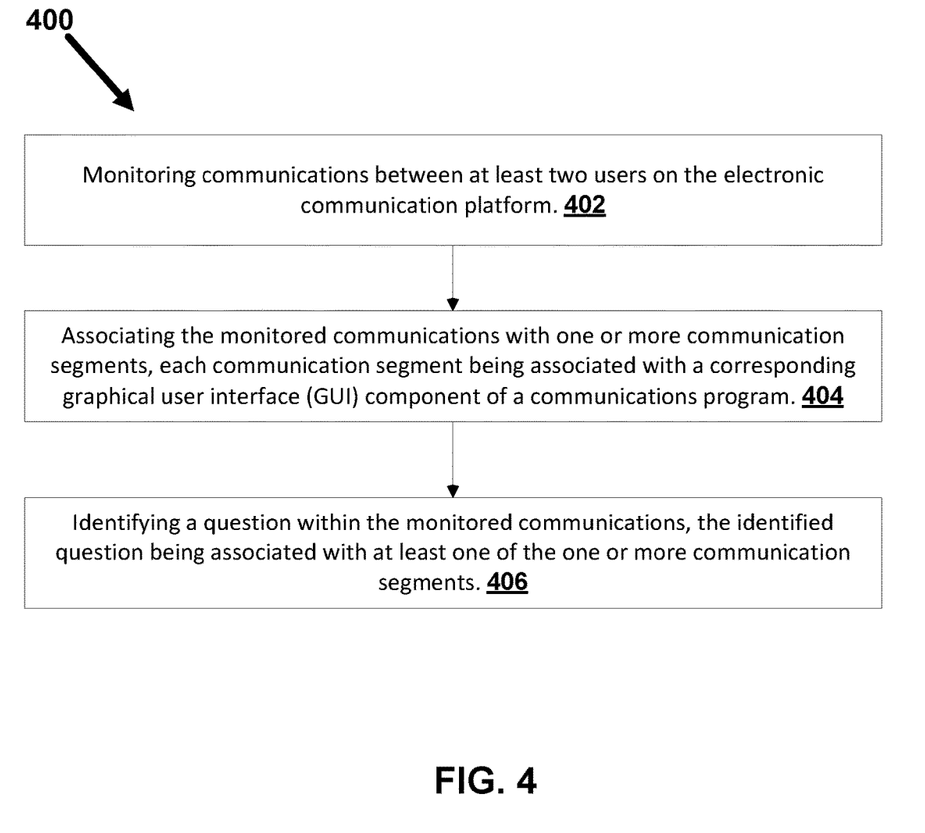
FIG. 4 is a flowchart of a method, according to an embodiment of the invention.

FIG. 4 is a flowchart of a computer implemented method 400 online chat questions identification, topic segmentation, and visualization according to an embodiment of the invention. The method may be implemented via a set of programming instructions executable by a processor of a computer, and may be embodied on a tangible storage device of a computer. For example, method 400 may be a computing program as described in connection with FIG. 5.

Generally, method 400 may be a method employed in the electronic communication platform 200 (FIG. 2), and may be performed by the various modules thereof, to operate communication program 204 on server 202.

Referring now to FIGS. 2 and 4, electronic communication platform 200 monitors (step 402) communications between at least two users, user device 206 and moderator device 212 on the electronic communication platform 200. For example, communication program 204 monitors communication received from user communication program 210 and moderator communication program 216.

Electronic communication platform 200 associates (step 404) the monitored communications with one or more communication segments, each communication segment being associated with a corresponding GUI component of a communications program. For example, communication segment is associated with segment 2, therefore GUI segment2 310 is associated with the communication.

Electronic communication platform 200 identifies (step 406) a question within the monitored communications, the identified question being associated with at least one of the one or more communication segments. For example, if electronic communication platform 200 identifies a question and segment1 304 is associated with the incoming communications while segment2 is associated with the identified question the electronic communication platform 200 will associate the question with GUI segment1 304 and GUI segment2 310.

Method 400 may also perform additional functions, not explicitly shown as separate steps in FIG. 4, according to various embodiments of the invention. According to an embodiment, method 400 iteratively monitoring each communication and associates it with a segment.

According to a further embodiment, method 400 includes displaying the messages in associated GUI component of a communication program 204.

Referring now generally to embodiments of the invention, several moderator communication programs may be connected to communication program 204 where each moderator may have different topics. These topics may be predetermined, dynamically determined, or manually determined. According to an embodiment, communication program 204 associates each communication to a segment corresponding to a specific topic that each moderator chooses. When a question is identified, communication program 204 associates the question with the appropriate segment; this is done for each moderator. Communication program 204 displays the GUI component associated with the question on moderator device 212. The topic is displayed at the top of the GUI component such as at segment1 304. The monitored communications associated with the topic are displayed at the first half of the GUI component such as chat1 302 and the question is displayed in the bottom of the same GUI component such as questions1 306. According to an embodiment, if several questions are identified as related to the same segment, they are displayed in the same GUI component. In a further embodiment, GUI component may include an input text line near each question allowing the moderator to input an answer to the question. In additional embodiment, each question displayed in a GUI component may have a corresponding checkbox giving a graphical representation whether the question was answered. In further embodiment, each segment may have a graphical representation such as an icon or a corresponding color figure representing the number of identified questions in each segment and another graphical representation as to a number of answered questions in each segment for a moderator to identify the number of questions and a status of each question associated with the segment. For example, for each topic name displayed in segment1 304 there may be red bars where each bar represent an identified question. Whenever the moderator answers the identified question the red colored bar representing the question will change the color to green. In a further embodiment, if an identified question does not belong to any of the segments predetermined by a moderator, a new GUI component representing all the unsegmented questions and/or communications is generated and displayed to the moderator.

Figure 5:
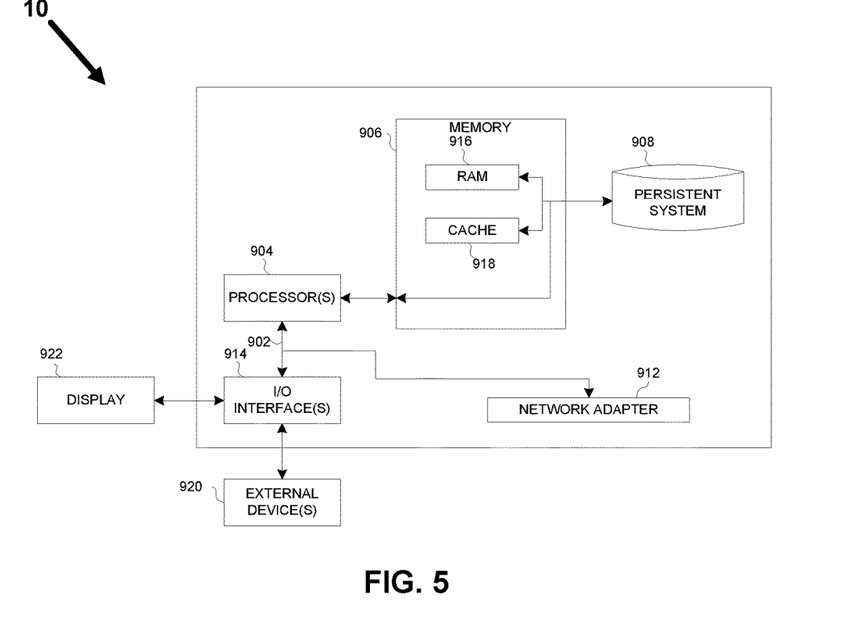
FIG. 5 is a block diagram of an illustrative computing device or node such as, server, user device, and moderator device, according to an embodiment of the invention.

FIG. 5 depicts a functional block diagram of a computing device or computing node 10, according to an embodiment of the invention. For example, the computing device or computing node 10 may correspond to server 202, user device 206, and moderator device 212 (FIG. 2), in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

A server 202, user device 206, and moderator device 212 include communications fabric 902, which provides communications between computer processor(s) 904, memory 906, persistent storage 908, communications unit 912, and input/output (I/O) interface(s) 914. Communications fabric 902 may be implemented with any architecture designed for passing data and/or control information between processors (such as microprocessors, communications and network processors, etc.), system memory, peripheral devices, and any other hardware components within a system. For example, communications fabric 902 may be implemented with one or more buses.

Memory 906 and persistent storage 908 are computer-readable storage media. In this embodiment, memory 906 includes random access memory (RAM) 916 and cache memory 918. In general, memory 906 may include any suitable volatile or non-volatile computer-readable storage media.

Communication program 204, user communication program 210, and moderator communication program 216 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is part of persistent storage 908.

Communications unit 912, in these examples, provides for communications with other data processing systems or devices. In these examples, communications unit 912 includes one or more network interface cards. Communications unit 912 may provide communications using one or both of physical and wireless communications links. Communication program 204, user communication program 210, and moderator communication program 216 may be downloaded to persistent storage 908 through communications unit 912.

I/O interface(s) 914 allows for input and output of data with other devices that may be connected to communication program 204, user communication program 210, and moderator communication program 216. For example, I/O interface 914 may provide a connection to external devices 920 such as a keyboard, keypad, a touch screen, and/or some other suitable input device. External devices 920 may also include portable computer-readable storage media such as, for example, thumb drives, portable optical or magnetic disks, and memory cards. Software and data used to practice embodiments of the present invention, e.g., Communication program 204, user communication program 210, and moderator communication program 216 may be stored on such portable computer-readable storage media and may be loaded onto persistent storage 908 via I/O interface(s) 914. I/O interface(s) 914 may also connect to a display 922.

Display 922 provides a mechanism to display data to a user and may be, for example, a computer monitor.

Cloud computing is a model of service delivery for enabling convenient, on-demand network access to a shared pool of configurable computing resources (e.g., networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Characteristics are as follows:

On-demand self-service: a cloud consumer may unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities may be rapidly and elastically provisioned, in some cases automatically, to quickly scale out and rapidly released to quickly scale in. To the consumer, the capabilities available for provisioning often appear to be unlimited and may be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage may be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which may include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
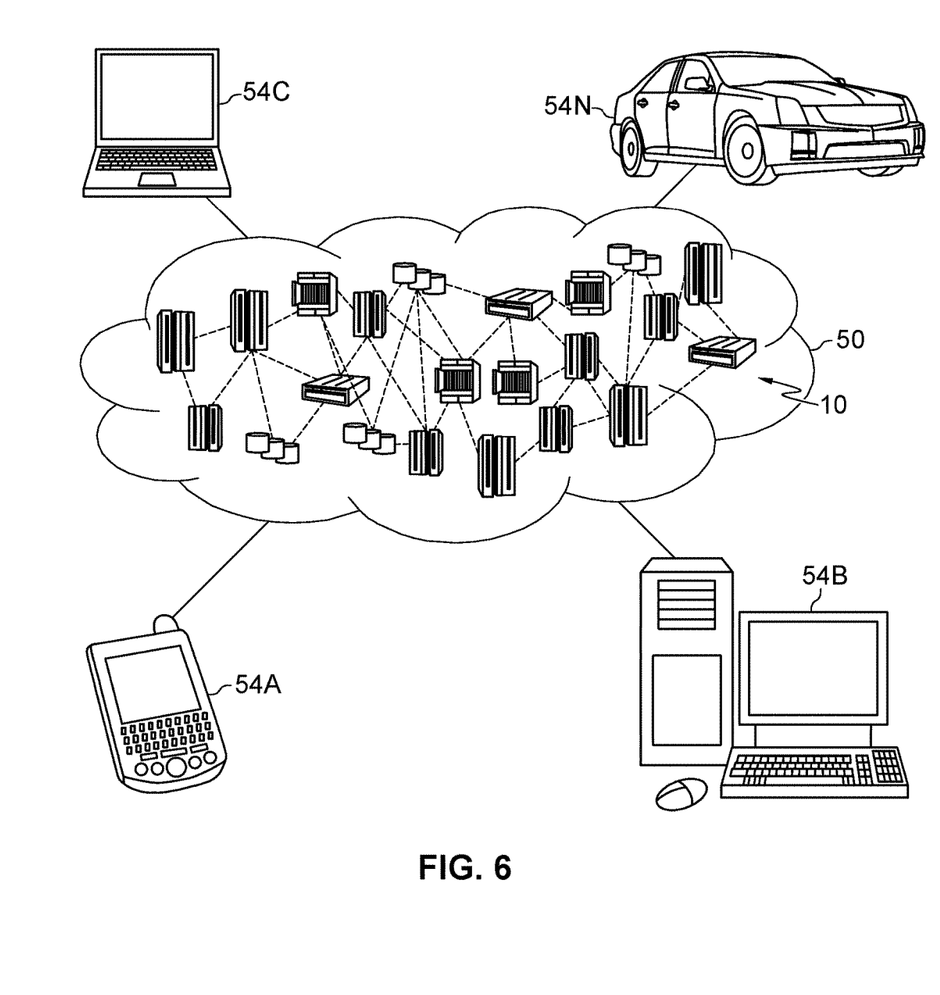
FIG. 6 is a diagram of an illustrative cloud computing environment, according to an embodiment of the invention.

Referring now to FIG. 6, illustrative cloud computing environment 50 is depicted. As shown, cloud computing environment 50 includes one or more cloud computing nodes 10 (such as the computing device or the computing node depicted in FIG. 5) with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 may communicate with any type of computerized device over any type of network and/or network addressable connection (e.g., using a web browser).

Figure 7:
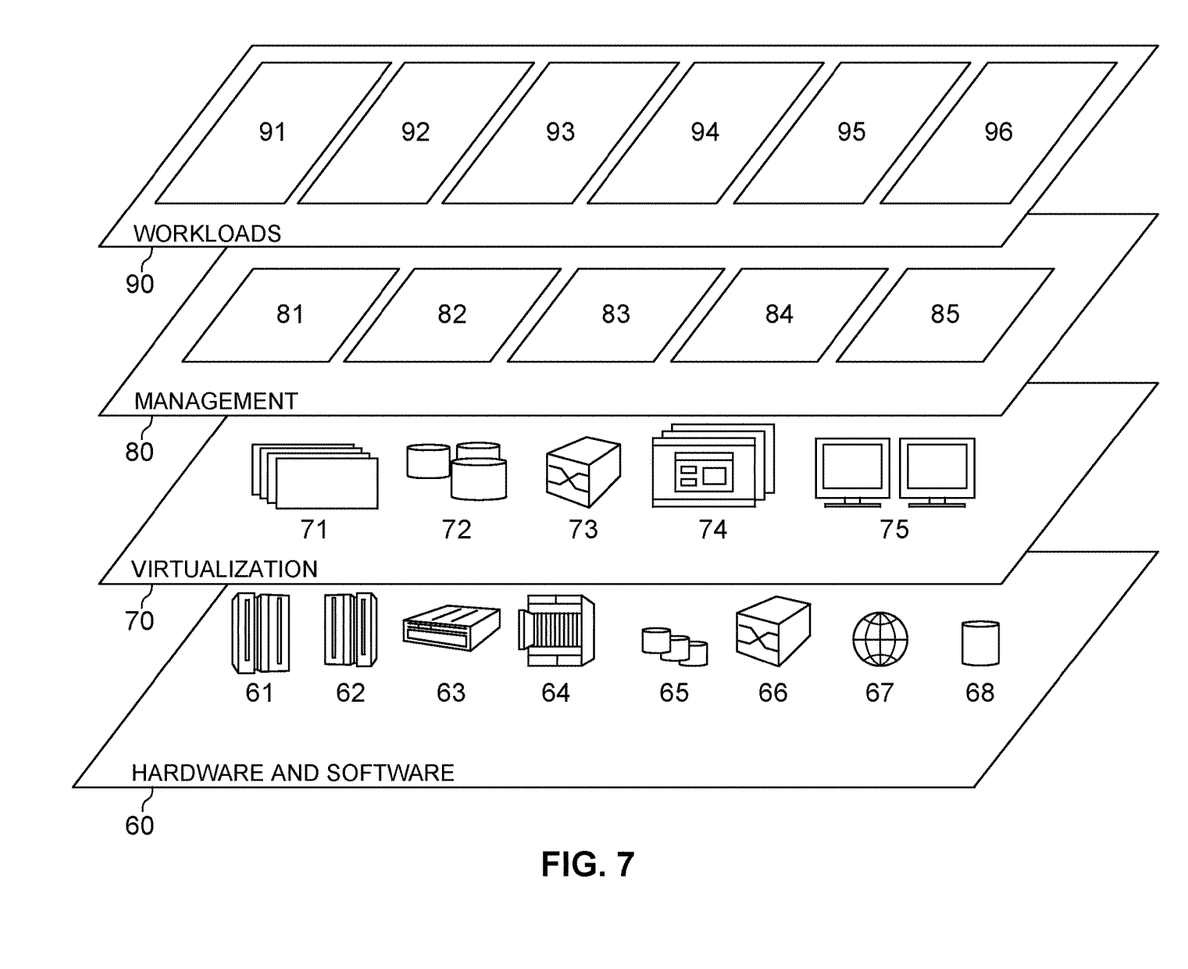
FIG. 7 is a diagram of functional layers of the cloud computing environment of FIG. 6, according to an embodiment of the invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and electronic communication platform 96. Electronic communication platform 96 may relate to functionality that monitors communications, associates each communication with a corresponding segment, identifies a question and displays the segment and associated question in the corresponding segment.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

What is claimed is:

1. A method for processing questions in an electronic communication platform, comprising:
    monitoring communications between at least two users on the electronic communication platform;
        associating the monitored communications with one or more communication segments, each communication segment being associated with a corresponding graphical user interface (GUI) component of a communication program, wherein associating the monitored communications with one or more communication segments further comprises:
        determining a topic of the monitored communications, wherein the topic is determined during a runtime while monitoring the communications;
        associating the monitored communications to a communication segment having a topic that matches the topic of the monitored communications, wherein the one or more communication segments are identified based on natural language processing (NLP) of the monitored communications;
    identifying a question within the monitored communications;
    associating the identified question with at least one question component of the GUI of at least one of the one or more communication segments;
    displaying at least one of the one or more communication segments, including the corresponding GUI component and the corresponding at least one question component, wherein the corresponding at least one question component comprises the identified question and a color bar; and
    based on determining an answer to the identified question, changing a color of the color bar.

2. The method of claim 1, wherein the one or more communication segments are identified based on input from a moderator.

3. The method of claim 1, wherein the one or more communication segments are identified based on natural language processing (NLP) of the monitored communications, wherein the NLP comprises identifying at least one topic for the monitored communications, and wherein the method further comprises:
    associating the at least one topic with at least one of the one or more communication segments.

4. The method of claim 1, further comprising:
    communicating, to a moderator device, data identifying the monitored communications, the question, and associations with the one or more communication segments and the corresponding GUI component.

5. The method of claim 4, further comprising:
    displaying via a GUI, on the moderator device, the one or more communication segments including the monitored communications and the question, wherein the displaying of each communication segment is based on the corresponding GUI component.

6. The method of claim 1, wherein the electronic communication platform is an online chatting application.

7. A computer program product for processing questions in an electronic communication platform, comprising:
    one or more computer-readable storage devices and program instructions stored on at least one of the one or more tangible storage devices, the program instructions comprising:
    program instructions to monitor communications between at least two users on the electronic communication platform;
        program instructions to associate the monitored communications with one or more communication segments, each communication segment being associated with a corresponding graphical user interface (GUI) component of a communication program, wherein associating the monitored communications with one or more communication segments further comprises:
        program instructions to determine a topic of the monitored communications, wherein the topic is determined during a runtime while monitoring the communications;
        program instructions to associate the monitored communications to a communication segment having a topic that matches the topic of the monitored communications, wherein the one or more communication segments are identified based on natural language processing (NLP) of the monitored communications;
    program instructions to identify a question within the monitored communications;

program instructions to associate the identified question with at least one question component of the GUI of at least one of the one or more communication segments;

program instructions to display at least one of the one or more communication segments, including the corresponding GUI component and the corresponding at least one question component, wherein the corresponding at least one question component comprises the identified question and a color bar; and based on determining an answer to the identified question, program instructions to change a color of the color bar.

8. The computer program product of claim 7, wherein the one or more communication segments are identified based on input from a moderator.

9. The computer program product of claim 7, wherein the one or more communication segments are identified based on natural language processing (NLP) of the monitored communications, wherein the NLP comprises program instructions to identify at least one topic for the monitored communications, and wherein the computer program product comprises:

program instructions to associate the at least one topic with at least one of the one or more communication segments.

10. The computer program product of claim 7, further comprising:

program instructions to communicate, to a moderator device, data identifying the monitored communications, the question, and associations with the one or more communication segments and the corresponding GUI component.

11. The computer program product of claim 10, further comprising:

program instructions to display via a GUI, on the moderator device, the one or more communication segments including the monitored communications and the question, wherein program instructions to display of each communication segment is based on the corresponding GUI component.

12. The computer program product of claim 7, wherein the electronic communication platform is an online chatting application.

13. A computer system for processing questions in an electronic communication platform, comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to monitor communications between at least two users on the electronic communication platform;

program instructions to associate the monitored communications with one or more communication segments, each communication segment being associated with a corresponding graphical user interface (GUI) component of a communication program, wherein associating the monitored communications with one or more communication segments further comprises:

program instructions to determine a topic of the monitored communications, wherein the topic is determined during a runtime while monitoring the communications;

program instructions to associate the monitored communications to a communication segment having a topic that matches the topic of the monitored communications, wherein the one or more communication segments are identified based on natural language processing (NLP) of the monitored communications;

program instructions to identify a question within the monitored communications;

program instructions to associate the identified question with at least one question component of the GUI of at least one of the one or more communication segments;

program instructions to display at least one of the one or more communication segments, including the corresponding GUI component and the corresponding at least one question component, wherein the corresponding at least one question component comprises the identified question and a color bar; and based on determining an answer to the identified question, program instructions to change a color of the color bar.

14. The computer system of claim 13, wherein the one or more communication segments are identified based on input from a moderator.

15. The computer system of claim 13, wherein the one or more communication segments are identified based on natural language processing (NLP) of the monitored communications, wherein the NLP comprises program instructions to identify at least one topic for the monitored communications, and wherein the computer program product comprises:

program instructions to associate the at least one topic with at least one of the one or more communication segments.

16. The computer program product of claim 13, further comprising:

program instructions to communicate, to a moderator device, data identifying the monitored communications, the question, and associations with the one or more communication segments and the corresponding GUI component.

17. The computer system of claim 16, further comprising:

program instructions to display via a GUI, on the moderator device, the one or more communication segments including the monitored communications and the question, wherein program instructions to display of each communication segment is based on the corresponding GUI component.

18. The computer system of claim 13, wherein the electronic communication platform is an online chatting application.

* * * * *